(No Model.)
G. MERCER.
Machine for Disintegrating and Drying Fertilizers.
No. 237,080. Patented Jan. 25, 1881.
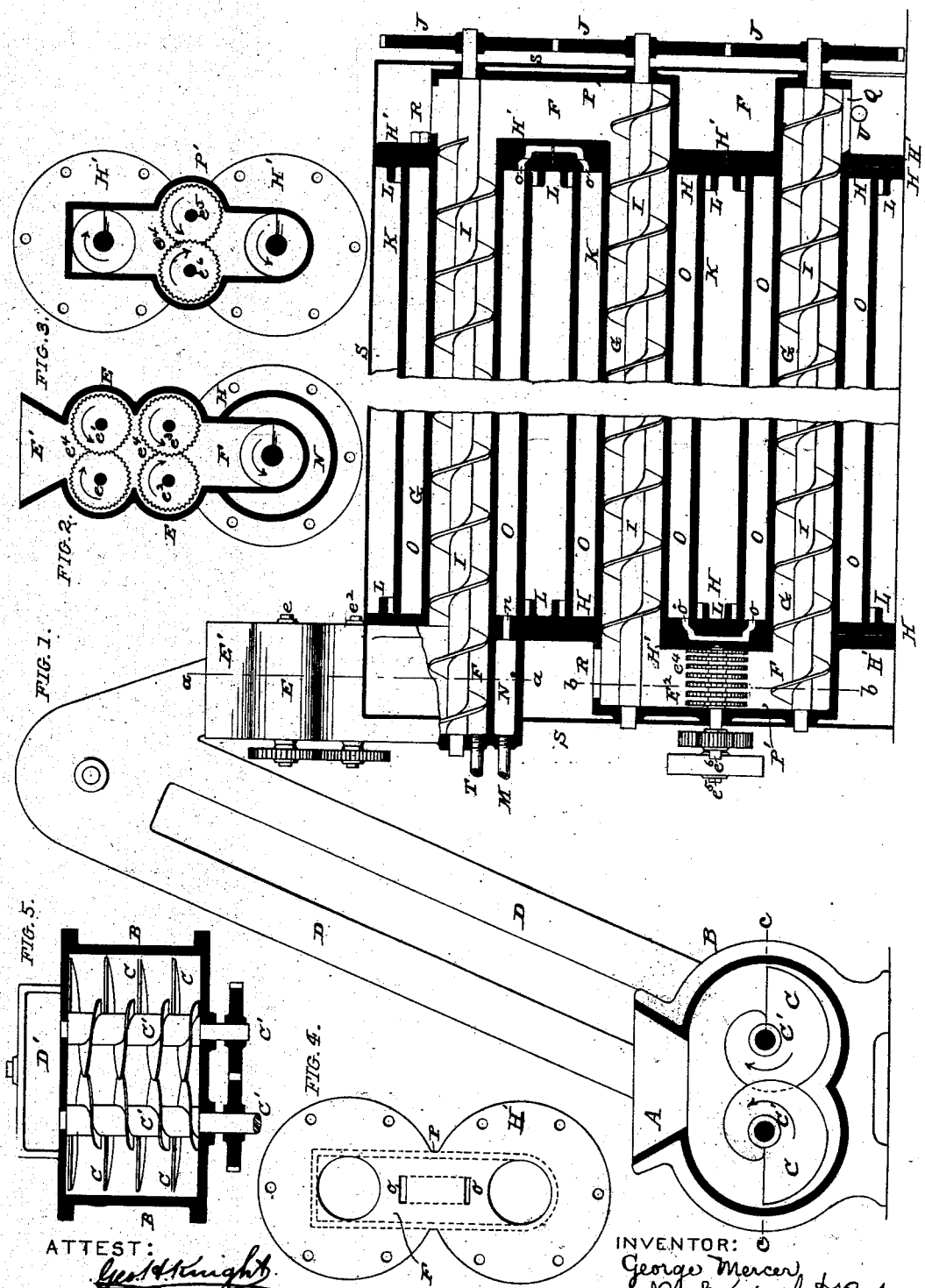

UNITED STATES PATENT OFFICE.

GEORGE MERCER, OF ST. LOUIS, MISSOURI.

MACHINE FOR DISINTEGRATING AND DRYING FERTILIZERS.

SPECIFICATION forming part of Letters Patent No. 237,080, dated January 25, 1881.

Application filed April 6, 1880. (No model.)

*To all whom it may concern:*

Be it known that I, GEORGE MERCER, residing at the city of St. Louis, in the State of Missouri, have invented Improvements in Machines for Disintegrating and Drying Fertilizers and other Materials, of which the following is a specification.

The scope of my invention is set forth in the claims, reference being had to the general description.

In the drawings, Figure 1 is a view of the machine, part in side elevation, with the end of the cutting-box removed, and part in section in the plane of the axis of the drying-cylinders, the central portion being broken away. Fig. 2 is a section at $a\ a$; and Fig. 3 is a section at $b\ b$, Fig. 1. Fig. 4 is an inside view of two cylinder-heads, showing the position of the connecting passage or chamber in dotted lines. Fig. 5 is a top view of the rotary cutter, with the cutter-box in section at $c\ c$, Fig. 1.

A is the hopper of the cutting-box B. This box is of nearly the form of a double cylinder, each part containing an axial rotating shaft, $C'$, carrying a number of cutters C, of involute form, as shown in Fig. 1. The cutters C are not flat, but are formed like the blades of a screw-conveyer, so that they act not only to cut up the material fed into the hopper A, but also as a conveyer to carry it endwise in the box to the lower end of the elevator D, by which it is carried up and dropped into the hopper $E'$ of disintegrator E. The cutters C are so placed on the shafts $C'$ that those upon one shaft lap past those upon the other shaft in part of their circumference, and operate in the manner of shears so as to keep the edges clear. Thus it will be seen that the contents of the box B are cut and mixed and conveyed to the elevator by the action of the cutters C alone.

The elevator may be of the usual kind, having an endless belt carrying buckets suitable for carrying up the material from the box B to the hopper $E'$.

The disintegrator E contains four rotating cutter-shafts, $e\ e'\ e^2\ e^3$, upon each of which is a series of circular toothed cutters or saws, $e^4$. The saw-shafts are arranged in pairs, in which the relative position of the saws is such that the teeth of those upon one shaft of each pair lap past the teeth of the saws upon the other shaft of the same pair. The saws rotate in the direction shown by arrows, so that they tend to carry down the material between them, the upper set of saws dropping it upon the under set. One shaft of each pair rotates at a faster speed than the other—say four to one—the gear-wheels $E^3$ upon the shafts engaging together and being suitably proportioned. From the lower set of saws the material passes into a chamber, F, in line with the first drying-cylinder, G. The drying-cylinders are plain cylinders screwed fast in heads H. The cylinders contain screw-conveyers turned by a train of spur-wheels, J, upon their shafts. The screw-conveyers I are shown as extending to the tops of the cylinders G; but this is not necessary, nor may it be the most desirable form of construction. The conveyers may have a less diameter than the inside diameter of the cylinders, and be in contact only with the bottom of the cylinders, so as to leave a space above them for the passage of damp airs and vapors. Each cylinder G is surrounded by a concentric cylinder or case, K, whose ends are closed by the cylinder-heads H, the joint between the cylinders being made tight by iron cement or other packing calked into the space between the cylinder K and the flange L cast upon the head H. Thus it will be seen that each cylinder G is surrounded by a chamber between it and the cylinder K. This space is supplied with steam entering through a pipe, M, in communication with the steam-space N beneath the chamber F. This space communicates with the upper annular steam-space, O, by a passage, $n$, and all of these steam-spaces O are in communication by ports $o$ extending through the metal of the heads H and $H'$. P and $P'$ are castings bolted to the heads H by means of heads $H'$, the joint being made tight by a gasket between the heads H $H'$ in the usual manner. The castings P and $P'$ have chambers F in communication with the inside of the cylinders G, so that the material is carried from the chamber into the cylinders by the conveyer I, which works in the bottom of the chambers.

In the casting $P'$, between the central and lower cylinders, is a disintegrator, $E^2$, having a pair of shafts, $e^5\ e^6$, carrying disintegrating-saws $e^4$, to powder the material after it has been rendered hard by drying. These saws are arranged in the same manner as the saws $e^4$ on shafts $e\ e'\ e^2\ e^3$, one shaft of the pair having a more rapid rotation than the other, for the reason before set forth. There may be two or more disintegrators, $E^2$, in the course of the material.

Q is the discharge-orifice by which the dried and disintegrated product leaves the apparatus.

R R are orifices for the escape of effluvia or obnoxious gases, the same escaping into the chamber within the inclosing-case S, and escaping therefrom into a furnace, chimney, or other suitable place. The gases may be drawn from the chamber by a suction-fan.

T is a pipe in communication with a suction-fan to exhaust the damp air and vapor from the interior of the cylinders G, the air entering said cylinders through the discharge-opening Q, or through a pipe whose mouth is shown at U. A blast of heated or dried air may be forced into the apparatus through the pipe U to supply and aid the discharge at T. When the air and vapor are drawn through pipe T the orifices R may be closed.

I am aware that it is not new to pass grain through steam-heated cylinders, using as a means of propulsion a spiral conveyer or worm-shaft; neither is it new to pass a current of heated air over the grain while passing through the cylinders.

I am also aware that fertilizing material, after having passed through grooved rollers, has been passed through a revolving cylinder, in which it is subjected to the action of a current of heated air.

I claim as my invention—

1. The combination, in a drying apparatus, of cylinders G, surrounded by a steam-chamber, O, conveyers I, and disintegrating-saws $e^4$, for the purpose set forth.

2. The combination, with the drying-cylinders, of the second set of disintegrating-saws $e^4$ on shafts $e^5\ e^6$, interposed in the course of the material between the first and last drying-cylinders, for the purpose set forth.

3. The disintegrator, consisting of two sets of overlapping rotary saws, in combination with gearing for rotating the same at different rates of speed, as explained.

4. The cutting apparatus, consisting of involute helical blades overlapping and working together shearwise, in combination with disintegrating and drying apparatus, substantially as set forth.

5. The combination, in a disintegrating and drying machine, of the cutting device B C, elevator D, disintegrator E, drying-cylinders G, with conveyers I, and surrounded by steam-cylinders K, disintegrator $E^2$, orifice Q, and inclosing-case R, for the purpose set forth.

GEORGE MERCER.

Witnesses:
SAML. KNIGHT,
GEO. H. KNIGHT.